US012231591B2

(12) United States Patent
Wendt et al.

(10) Patent No.: US 12,231,591 B2
(45) Date of Patent: Feb. 18, 2025

(54) DEVICE WITH TRANSLATION MECHANISM

(71) Applicant: Microsoft Technology Licensing, LLC, Redmond, WA (US)

(72) Inventors: Nicholas Wendt, Seattle, WA (US); Karsten Aagaard, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 17/847,749

(22) Filed: Jun. 23, 2022

(65) Prior Publication Data

US 2023/0421672 A1 Dec. 28, 2023

(51) Int. Cl.
*H04M 1/02* (2006.01)
*G06F 1/16* (2006.01)

(52) U.S. Cl.
CPC ........ *H04M 1/0216* (2013.01); *G06F 1/1652* (2013.01); *G06F 1/1681* (2013.01); *H04M 1/0268* (2013.01); *H04M 2201/08* (2013.01); *H04M 2201/38* (2013.01)

(58) Field of Classification Search
CPC . H04M 1/0216; H04M 1/0268; G06F 1/1652; G06F 1/1681
See application file for complete search history.

(56) References Cited

U.S. PATENT DOCUMENTS

| 7,583,500 | B2 | 9/2009 | Ligtenberg et al. |
| 8,705,229 | B2 | 4/2014 | Ashcraft et al. |
| 8,729,987 | B2 | 5/2014 | Chen et al. |
| 9,389,647 | B2* | 7/2016 | Hwang ................. G06F 1/1681 |
| 11,275,410 | B1* | 3/2022 | Hosokai ............... G06F 1/1647 |
| 11,783,978 | B2* | 10/2023 | Tazbaz ................ E05B 65/0067 |
| | | | 361/807 |
| 2008/0061565 | A1 | 3/2008 | Lee et al. |
| 2019/0164675 | A1* | 5/2019 | Srinivasan ............. E05C 19/16 |
| 2020/0019217 | A1 | 1/2020 | Larsen et al. |
| 2020/0267861 | A1* | 8/2020 | Kim ...................... G06F 1/1615 |
| 2021/0125762 | A1* | 4/2021 | Singla ................. H04M 1/0214 |
| 2022/0037941 | A1* | 2/2022 | Holung .................... H02K 1/27 |
| 2022/0100238 | A1 | 3/2022 | Siddiqui et al. |

FOREIGN PATENT DOCUMENTS

| DE | 29701721 U1 | 4/1997 |
| WO | 2021015781 A1 | 1/2021 |

OTHER PUBLICATIONS

Rabbani, Shadab, "Oneplus Patent Hints at A Foldable Smartphone with Three Screens", Retrieved from: https://www.businessinsider.in/tech/mobile/news/oneplus-patent-hints-at-a-foldable-smartphone-with-three-screens/articleshow/87862274.cms, Nov. 23, 2021, 27 Pages.

"International Search Report and Written Opinion Issued in PCT Application No. PCT/US23/021850", Mailed Date: Aug. 29, 2023, 14 Pages.

* cited by examiner

*Primary Examiner* — David Bilodeau
(74) *Attorney, Agent, or Firm* — Rainier Patents, P.S.

(57) ABSTRACT

The description relates to hinged devices, such as hinged computing devices. One example can include a first portion extending from a hinge end to a distal end that includes a first magnet and a second portion extending from a hinge end to a distal end and includes a second magnet. A translation mechanism can cause a button to both send control signals for electronic components of the device and create a force that acts on the first magnet to affect magnetic attraction between the first and second magnets.

20 Claims, 8 Drawing Sheets

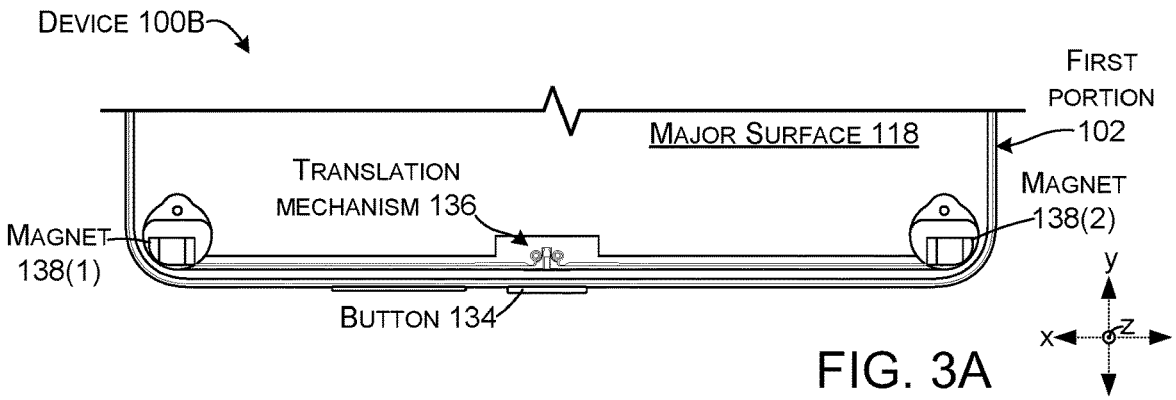
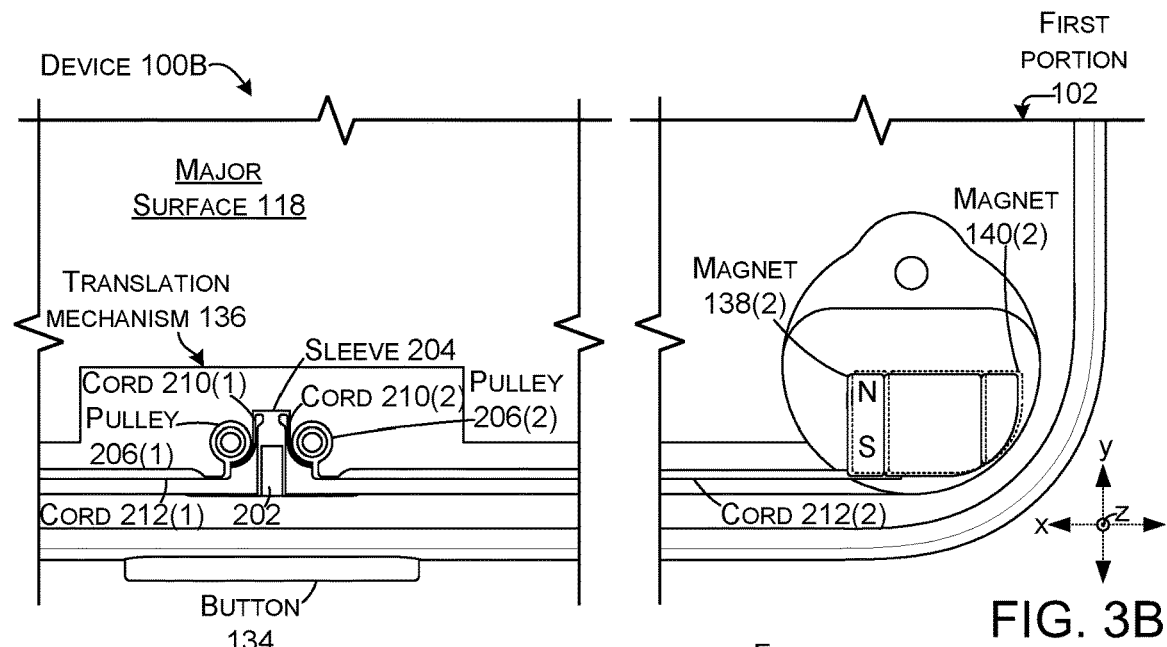
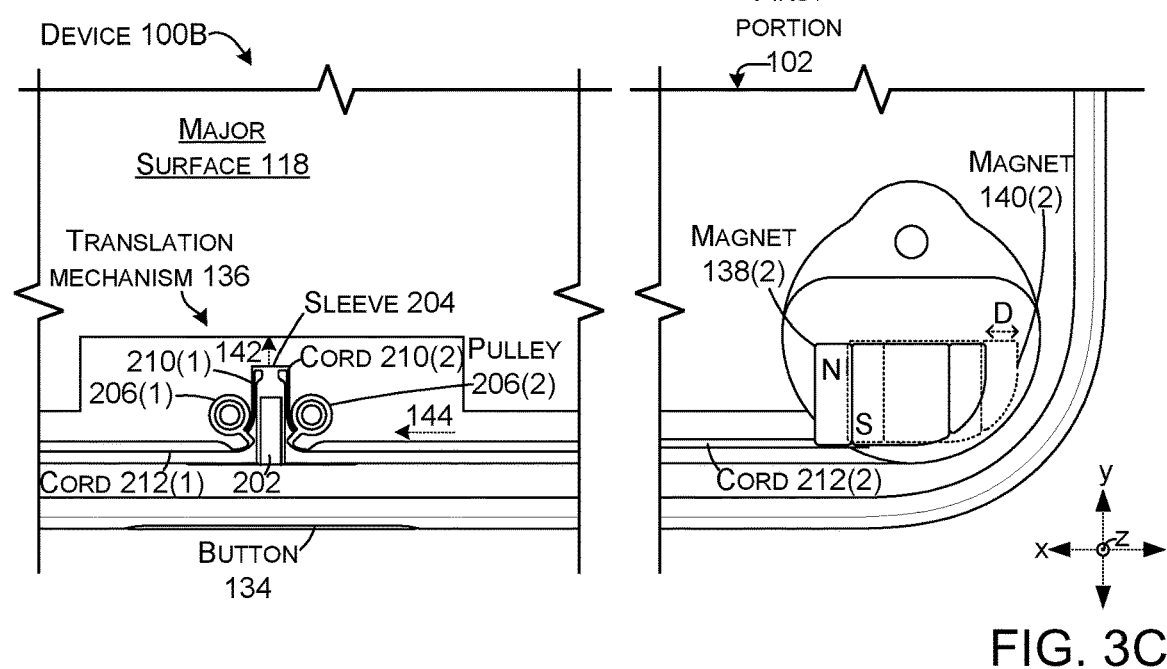

DEVICE WITH TRANSLATION MECHANISM

BACKGROUND

Many computer form factors such as smart phones, tablets, and notebook computers can provide enhanced functionality by folding for storage and opening for use.

SUMMARY

This patent relates to hinged computing devices. One example can include a first portion extending from a hinge end to a distal end that includes a first magnet and a second portion extending from a hinge end to a distal end, the hinge end being rotationally secured around a hinge axis to the hinge end of the first portion, and the distal end including a second magnet. The example can also include a button positioned on the distal end of the first portion that is coupled to electronic components of the first portion. The button can have a displacement that is toward the hinge axis and that is configured to send a control signal to the electronic components. A translation mechanism can be coupled between the button and the first magnet and be configured to translate the displacement that is toward the hinge axis to a force that is generally parallel to the hinge axis and acts upon the first magnet of the first portion to transition attraction between the first and second magnets from a first configuration with a relatively high attraction to a second configuration with a relatively low attraction.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

FIGS. 2A-2C, 3A-3C, 4A-4C, 5A-5C, and 6A-6C show elevational views of example devices in accordance with some implementations of the present concepts.

DESCRIPTION

The present concepts relate to devices, such as computing devices employing hinges that can couple first and second device portions. Many of these devices can include magnets in the first and second portions that can create a magnetic attraction to hold the device in a closed orientation. However, when the user wants to open the device, the magnetic attraction may make the process difficult, such as requiring two hands to overcome the magnetic attraction to open.

The device may also have a button for sending control signals, such as a power con' signal to electronic components of the device. Some of the present concepts can relate to a translation mechanism that can be employed to cause the button both to send the signals to control the electronic components and to create a force that acts on the first magnet to affect magnetic attraction between the first and second magnets. Thus, when the button is pushed to turn on the device the force can move the first magnet relative to the second magnet and decrease the attractive force so the device can be conveniently opened. These and other aspects are described below.

Figure 1A:
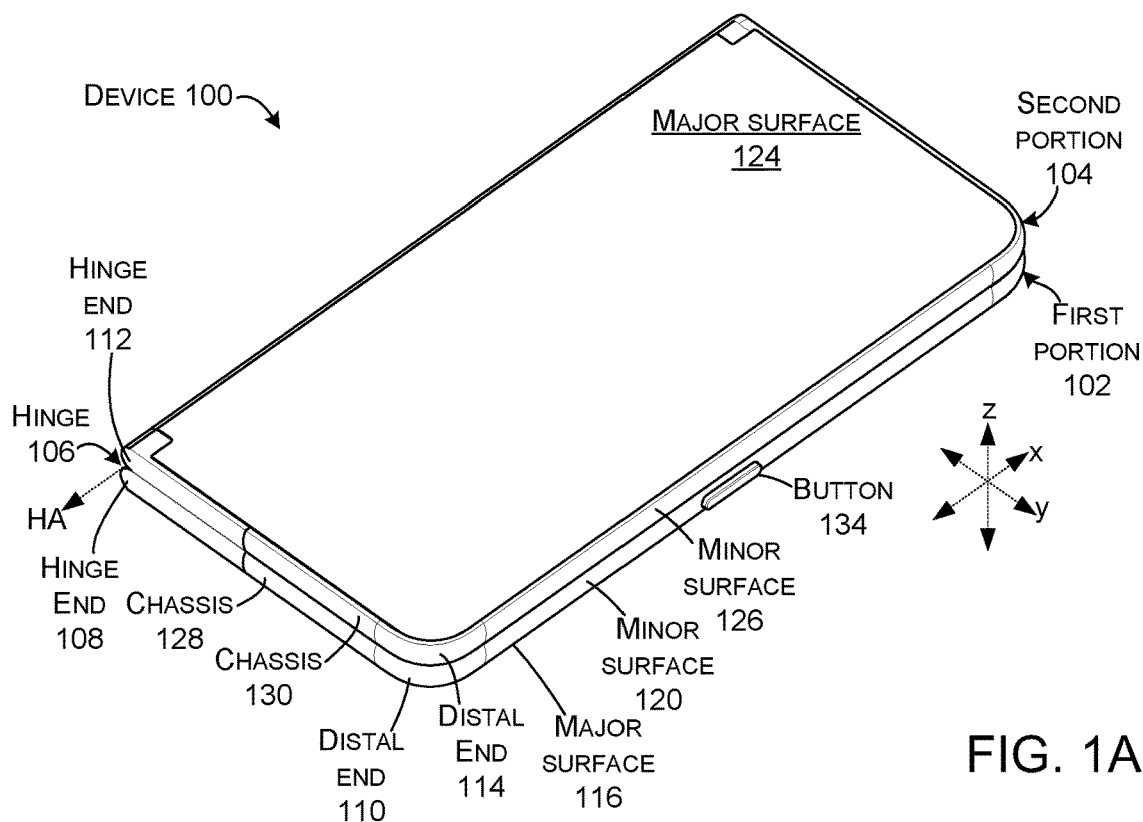
FIGS. 1A, 1B, 7A, and 7B show perspective views of example devices in accordance with some implementations of the present concepts.
Figure 1B:
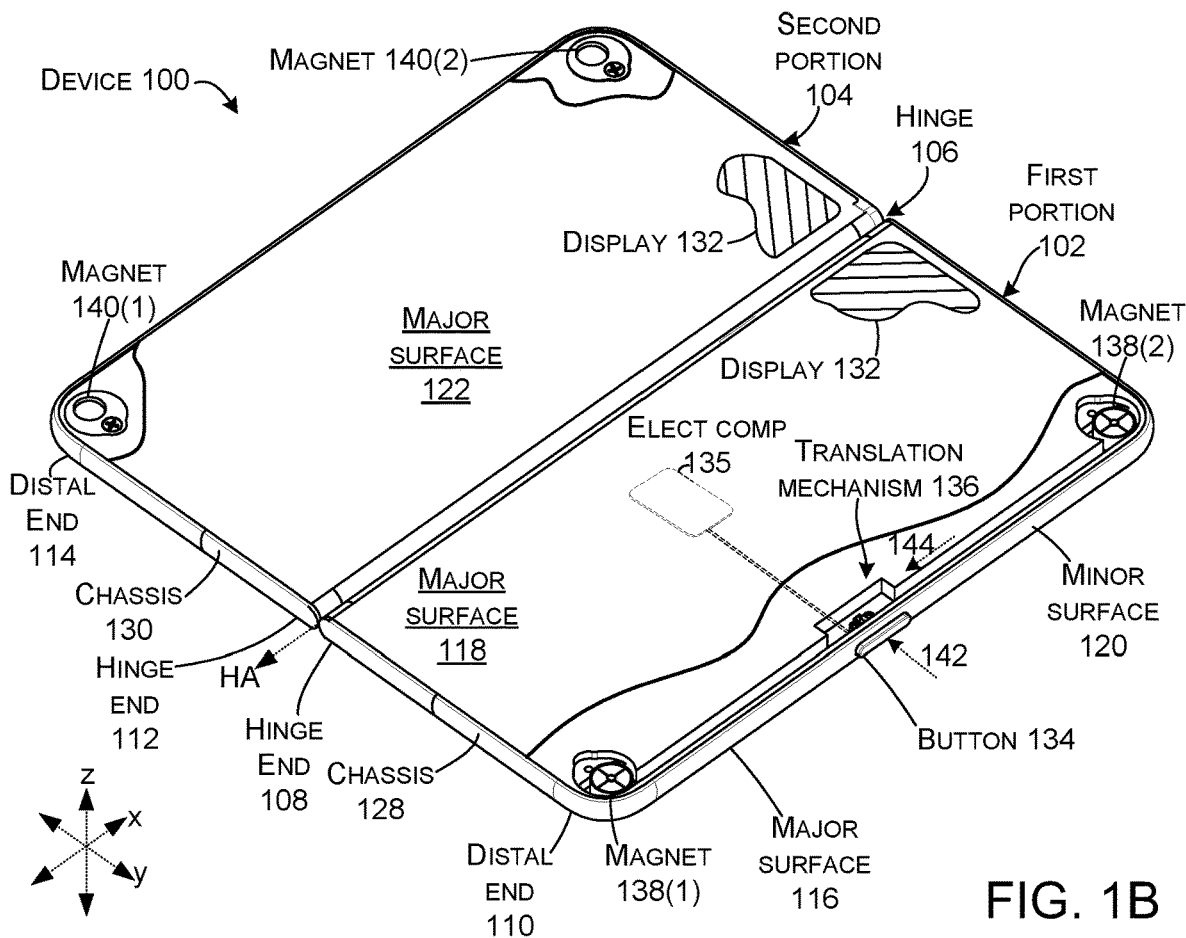
Figure 1C:
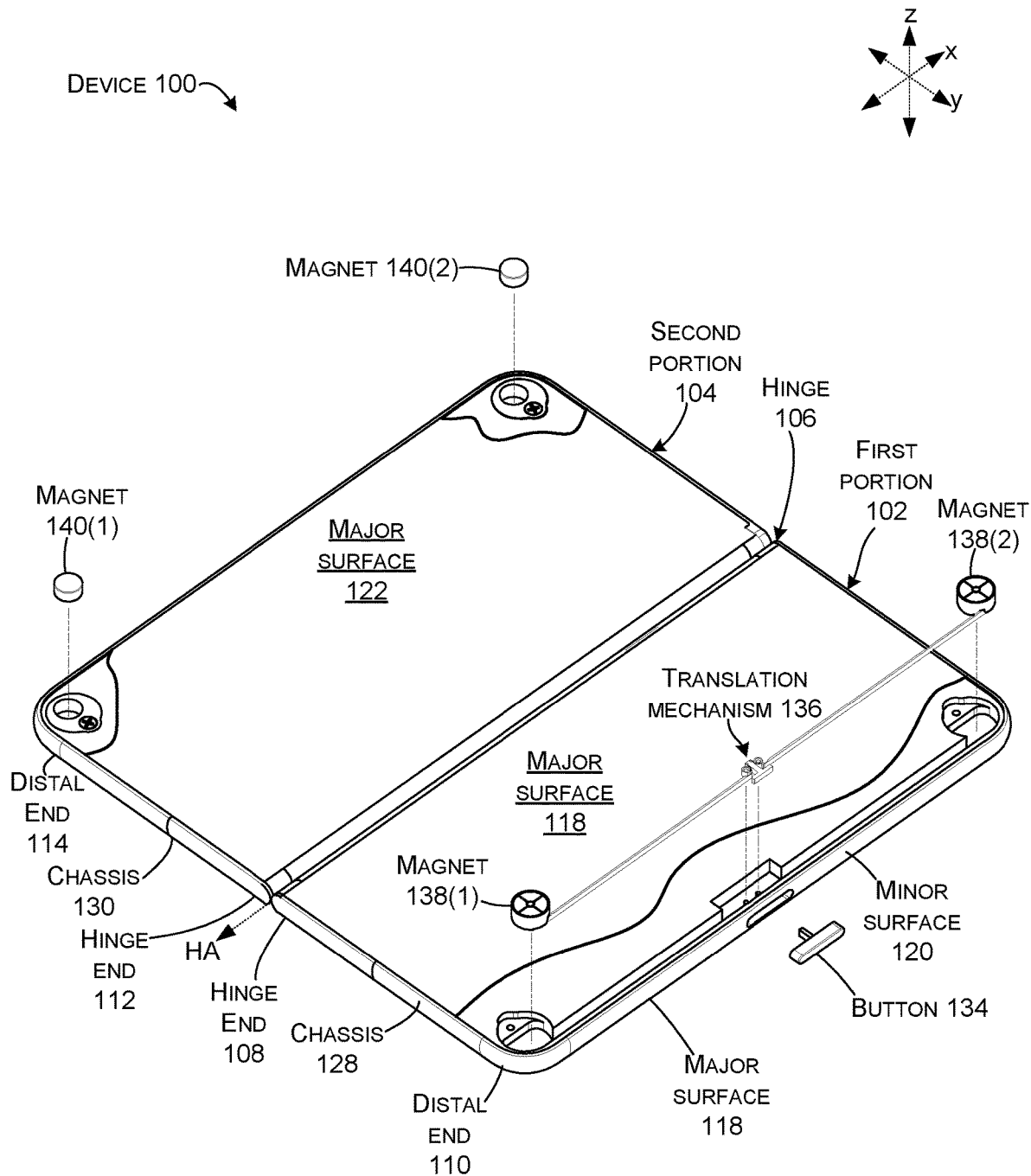
FIG. 1C shows an exploded perspective view of an example device in accordance with some implementations of the present concepts.

Introductory FIGS. 1A-1C collectively show an example device 100 that has first and second portions 102 and 104 that are rotatably secured together by hinge 106. FIG. 1A shows the device 100 in a closed or zero-degree orientation. FIG. 1B show a partial cut-away view of the device at a 180-degree orientation with the first and second portions adjacent to one another and lying in the same plane. FIG. 1C is similar to FIG. 1B, but is partially exploded to visualize some of the components.

The hinge 106 can define a hinge axis (HA). The first and second portions 102 and 104 can rotate around the hinge axis through a range of orientations, such as zero degrees to 180 degrees or zero degrees to 360 degrees. In this implementation, motion between the first and second portions can be rotation around a single hinge axis (HA). In other implementations the motion can entail rotation around multiple hinge axes. In still other implementations, the motion can be along a rotational trajectory where the axis or axes move depending on the orientation of the first and second portions.

The first portion 102 can extend from a hinge (e.g., proximal) end 108 to a distal end 110. The second portion 104 can also extend from a hinge (e.g., proximal) end 112 to a distal end 114. The first portion 102 can include opposing first and second major surfaces 116 and 118 (hereinafter, first and second surfaces) and connecting minor surfaces 120. Similarly, the second portion 104 can include opposing first and second major surfaces 122 and 124 (hereinafter, first and second surfaces) and connecting minor surfaces 126.

The first portion 102 can include a housing or chassis 128 and the second portion 104 can include a housing or chassis 130. The chassis 128 and 130 can define the surfaces (e.g., 116, 118, 120, 122, 124, and/or 126) and/or support various components, such as displays 132. In this example, the chassis 128 and 130 can generally approximate rectangular cuboids with some corner rounding (e.g., the shape of the chassis of the first portion can approximate a rectangular cuboid and the shape of the chassis the second portion can approximate a rectangular cuboid). Other configurations are contemplated. For instance, other implementations can have an overall curved profile with curved minor surfaces rather than linear minor surfaces 120. Similarly, major surfaces 116 and 122 may not be parallel to major surfaces 118 and 124, respectively in other implementations.

The first portion 102 can also include an activation switch or button 134, electronic components 135, a translation mechanism 136, and magnets 138 on the first portion 102. The second portion 104 can include magnets 140. The magnets 138 and 140 can function cooperatively to provide an attractive force to maintain the device in the closed orientation of FIG. 1A so that the portions do not inadvertently flop open. However, the attractive force may impede the user from opening the device when desired. The current concepts address these aspects by making the magnets convertible/transitionable from a first configuration with a relatively high magnetic attraction between the magnets 138 on the first portion 102 and the magnets 140 on the second portion 104 to a second configuration with relatively less magnetic attraction. The configuration of the magnets 138 can be controlled by button 134 and translation mechanism 136. This aspect will be described below relative to FIGS. 2A-6C.

In this version, the button 134 is positioned on the minor surface 120. The button 134 can be electrically connected to electronic components 135 of the device that can include processors, batteries, and/or the displays 132. User engagement of the activation button 134 (e.g., pushing the button 'in') can send a signal to the electronic components 135, such as a power con' or power 'off' signal. The user engagement can physically displace the button to cause the signal to be sent. In this configuration, the displacement can be from the distal end 110 and toward the hinge end 108 as indicated by arrow 142. A subsequent user engagement can cause equal displacement in the opposite direction (e.g., back to the 'out' position).

In this implementation, the button 134 can also be coupled to translation mechanism 136. The translation mechanism 136 can translate the displacement represented by arrow 142 to a force acting on the magnets 138 as represented by arrow 144. The translation mechanism 136 can be configured to translate the displacement of the button 134 that is generally toward the hinge axis to a force that is generally parallel to the hinge axis and acts upon the magnets 138. The force can be applied to the magnets 138 of the first portion 102 to control whether magnets 138 and 140 are in the first configuration with a relatively high attraction or the second configuration with a relatively low attraction. This aspect is described below relative to FIGS. 2A-6C as well as FIGS. 7A and 7B. As used herein, the term "generally toward" can mean having some component toward and can include straight toward and a range of angles, such as +/−45 degrees. Similarly, the term "generally parallel" as used herein can mean parallel and range of angles+/−25 degrees from parallel.

From one perspective, the translation mechanism 136 can provide a technical solution that allows the user engagement of the button 134 to provide two distinct functionalities. First, the user engagement can send an electrical signal that can be utilized as a control signal for the device. Second, the user engagement can be translated into a generally perpendicular orientation that can change the attraction between the device portions and hence effect opening characteristics of the device. The translation mechanism 136 can operate cooperatively with the button 134 to allow a single user action to achieve two distinct functions, such as power up the device and open the device from a closed orientation so the user can view the displays 132. As used herein, the term 'generally perpendicular' can mean perpendicular and a range of angles including+/−25 degrees from perpendicular.

Figure 2A:
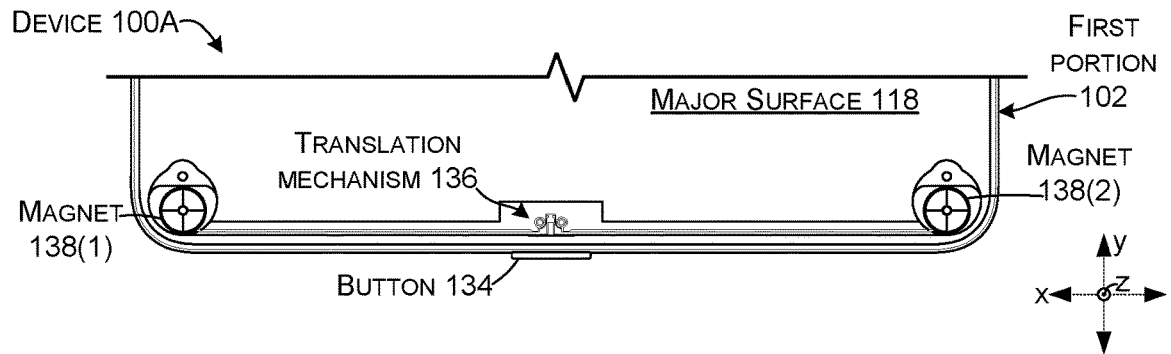
Figure 2B:
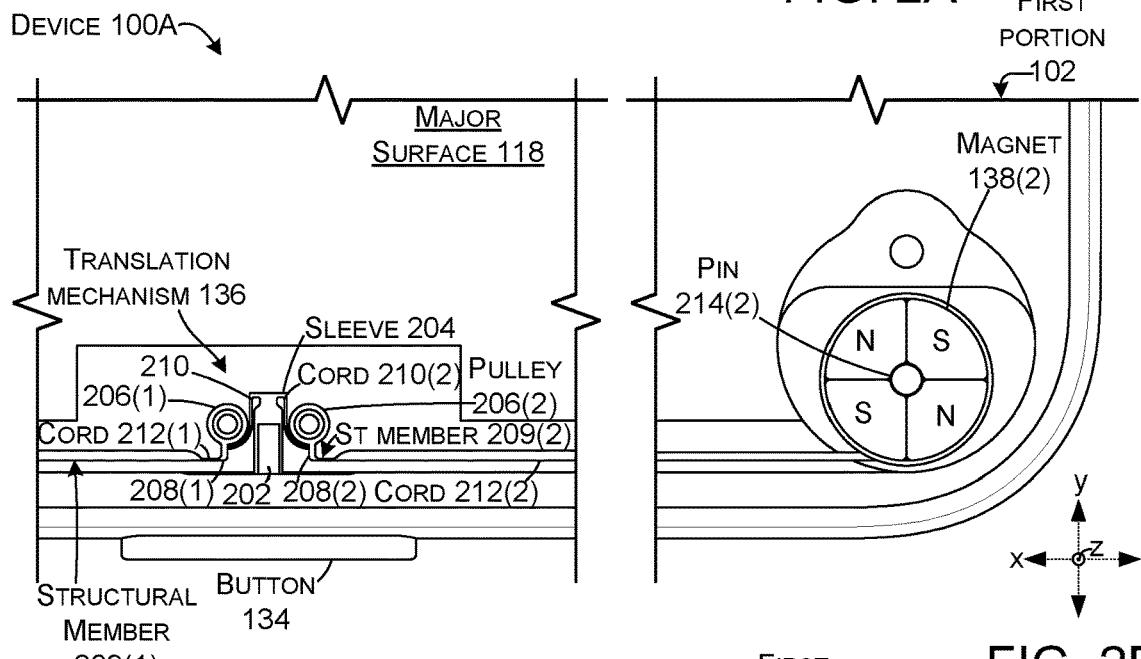
Figure 2C:
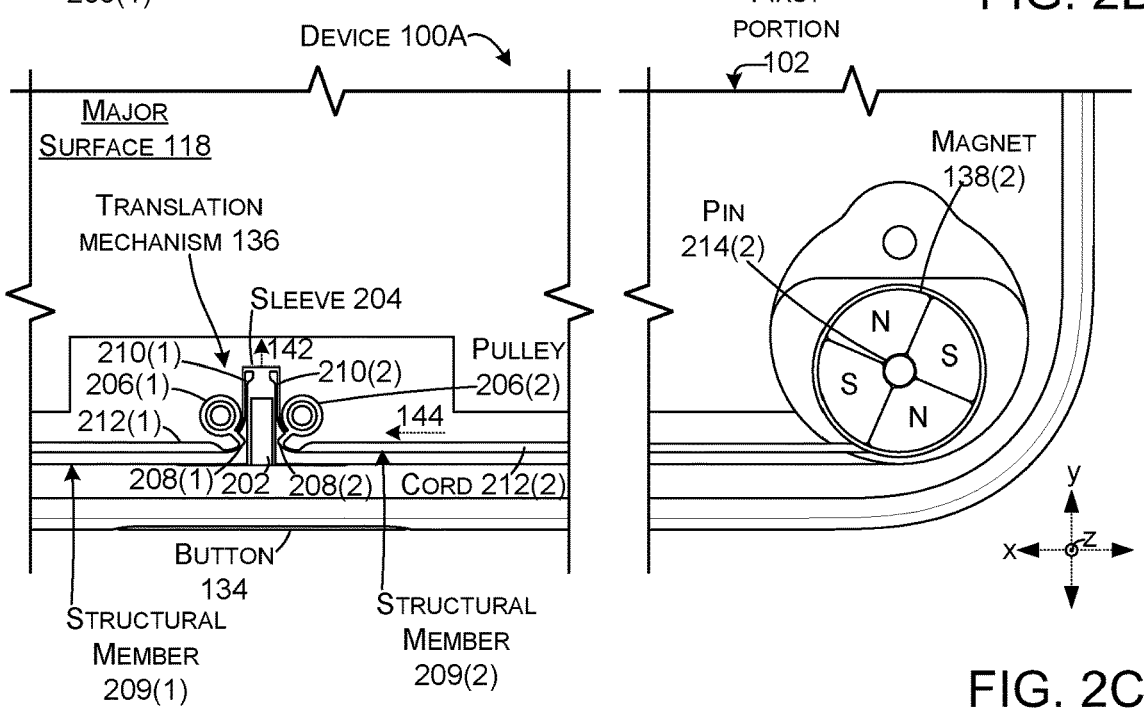

FIGS. 2A-2C collectively show details of example device 100A relating to translation mechanism 136 on first portion 102. FIG. 2A shows regions of the first portion 102 with the button 134 in the 'out' posture. FIG. 2B is similar to FIG. 2A and shows an enlarged view of regions of the first portion 102 with the button in the 'out' posture. FIG. 2C is a similar view to FIG. 2B with the button in the 'in' posture.

In this case, as shown in FIG. 2B the translation mechanism 136 can include a shaft 202, sleeve 204, pulleys 206, lever arms 208, structural members 209, such as cords 210, and cords 212. The magnets 138 can rotate around pins 214.

In this case, the magnets 138 can have four quadrants, with two opposing quadrants having north poles (N) and two opposing quadrants having south poles (S). While not shown in this view, in the button out posture of FIG. 2B the underlying magnets 140 of the second portion can have a complementary configuration with four quadrants so that the two N poles of magnets 140 are aligned with S poles of magnets 138 and S poles of magnets 140 are aligned with N poles of magnets 138. This configuration can create an attractive magnetic force in the closed orientation to maintain the first and second portions in the closed orientation.

FIG. 2C is similar to FIG. 2B, but shows the button 134 pushed in from user engagement (not shown). The button 134 is displaced in the y reference direction as reflected by arrow 142. The displacement can also be viewed as being toward the hinge axis HA, which is shown in FIGS. 1A-1C. The button displacement moves the shaft 202 in the y reference direction. The movement of the shaft moves the sleeve 204 in the same direction. The sleeve 204 is secured to structural members 209, which in this case are cords 210 and moves cords 210 in the y reference direction. The movement of cords 210 rotates the pulleys 206. The rotation of the pulleys 206 creates a force on the cords 212 and pulls the cords 212 in the x reference direction (e.g., parallel to the hinge axis HA). In turn, the cords 212 move the magnets 138. In this case, the movement is manifest as rotation of the magnets 138 around the pins 214. Rotating magnets 138 can decrease the attraction between magnets 138 of the first portion and magnets 140 of the second portion. This can make it easier for the user to open the device.

Specific examples are illustrated relating to how the translation mechanism 136 can translate button displacement into a force on the magnets 138, such as a force in the x direction to create linear and/or rotational magnet motion. Beyond these illustrated configurations, other configurations are contemplated, such as where the imparted forces are in the y reference direction and/or at an angle between the x reference direction and the y reference direction. In this example, the force translation can be accomplished, in part, via the pulleys 206. The pulleys offer a technical solution of both translating and allowing the force and amount of movement imparted on the magnets to be adjusted based upon the radius of the pulley.

In some configurations, the magnet rotation associated with the button displacement may even cause the magnets 138 and 140 to repel one another and create a pop-up force that automatically separates the first and second portions 102 and 104 when the user pushes the button 134. For instance, as discussed above, relative to FIG. 2B, the magnets 138 of the first portion 102 can be paired with magnets 140 of opposite polarity on the second portion 104 (e.g., N to S and S to N). However, when the magnets 138 of the first portion are rotated approximately 90 degrees by cord 212, the magnets are re-aligned (e.g., transitioned) to N to N and S to S and create a repulsive force to pop the first and second portions apart (e.g., quickly move the first and second parts apart).

Note that by employing lever arms 208 relative to pulleys 206 and cords 210 and 212, the extent of the movement of cords 212 in the x reference direction can be different (in this case more) than the movement of the shaft 202 in the y reference direction.

As mentioned above, the purpose of the button 134 may be as an input device to allow the user to send signals to control the device (e.g., turn the electronic components on or off). In this implementation, the button 134 can also be coupled to the translation mechanism 136. The translation mechanism 136 can allow multiple functionalities to be achieved with button displacement. The translation mechanism can provide a technical solution for translating the displacement of the button in one direction, such as perpendicular to the hinge axis, into a force in another direction, such as generally parallel to the hinge axis. This force can act on the magnets 138 to change the attraction force generated between magnets 138 and magnets 140 on the second portion. For instance, the translation mechanism 136 can cause the magnetic attraction to be transitioned from a relatively high attraction to a relatively low attraction and even potentially repulsion.

When the user engages button 134 again, the button can return to the physical position shown in FIG. 2B. This movement can be translated to move magnets 138 back to their orientation shown in FIG. 2B. In some cases, structural members 209 can have sufficient rigidity to push the magnets 138 back from the position of FIG. 2C to the position of FIG. 2B. Stated another way, the structural members can be rigid in order to translate both pulling and pushing forces. For instance, the structural members could be manifest as rigid beams or tubes, such as metal beams or polymer beams.

Alternatively or additionally, magnets 138 can have a slight bias toward the position of FIG. 2B. For instance, pins 214 can be spring loaded to maintain the magnets 138 at this orientation. Movement of the magnets 138 by force reflected by arrow 144 from the translation mechanism 136 to the position of FIG. 2C stores energy in the springs of the pins 214. When the force from the translation mechanism 136 is removed when the user engages the button 134 again, the spring force of the pins can return the magnets 138 to their original orientation. In such configurations, the structural members 209 can be manifest as cords 210 and 212 that are resistant to stretching and can convey pulling forces from the translation mechanism 136 to the magnets 138, but are not relied upon to push the magnets back to their original orientation. Instead, the cords 210 and/or 212 can create a force on the magnets 138 toward the translation mechanism 136 when the button is displaced from the 'out' posture to the 'in' posture. When the button is returned to the out position, the pulling force is removed and the spring force created by the pins 214 can return the magnets 138 to their original position.

In another configuration, the user displaces the button 134 to the 'in' position when the user wants to power on and open the device 102. When the user is done and closes the device the attraction between the magnets 138 and 140 can move the magnets 138 of the first portion 102 back to their original position, which in turn can force the button 'out'. In such a configuration a separate biasing mechanism does not need to be employed to return the device to the original button 'out' and device closed orientation.

FIGS. 3A-3C collectively show another example device 100B and the translation mechanism 136 on the first portion 102. FIG. 3A shows regions of the first portion 102 with the button 134 in the 'out' posture. FIG. 3B is similar to FIG. 3A and shows an enlarged view of regions of the first portion 102 with the button in the 'out' posture. FIG. 3C is a similar view to FIG. 3B with the button in the 'in' posture.

In this example, magnets 138 in the first portion 102 and the underlying magnets 140 (shown in ghost) of the second portion 104 can be aligned in the closed orientation of FIG. 3B to create a relatively high attractive force as represented by the N of magnet 138 being proximate to the S of magnet 140.

In this example, the translation mechanism 136 is similar to the translation mechanism 136 described above relative to FIGS. 2A-2C. In this case the y reference direction displacement of button 134 as represented by arrow 142 can be translated by the translation mechanism 136 into x direction movement of cord 212 as represented by arrow 144. The x direction movement of cord 212 moves magnet 138 linearly (e.g., laterally in this case) along the x axis by a distance D. Now the magnets 138 are not as aligned as represented by the N of magnet 138 being farther from the S of magnet 140. The user can now separate the first and second portions with much less force than would have been required with the magnets at the relatively high attraction configuration of FIG. 3B. This change in magnetic attraction between the first and second portions was achieved without any additional user action. Instead, the 'power on' button activation also produced the decreased magnetic attraction.

Figure 4A:
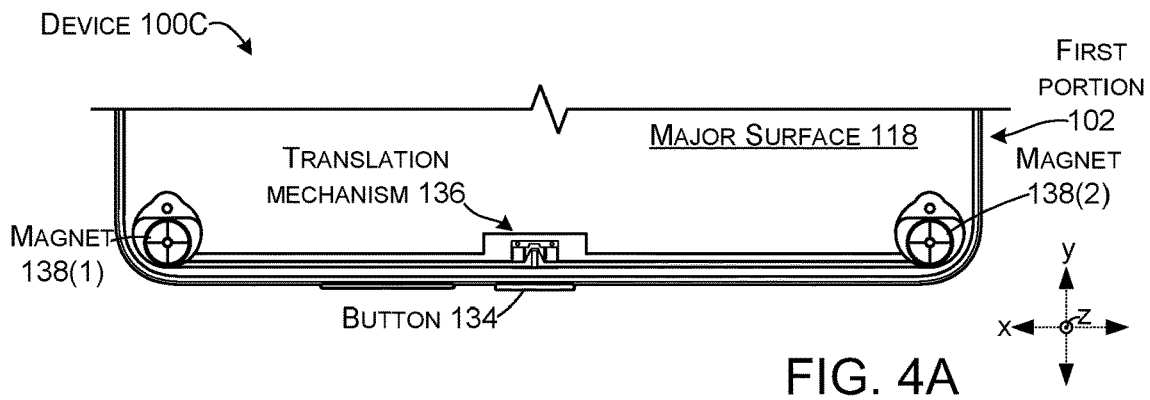
Figure 4B:
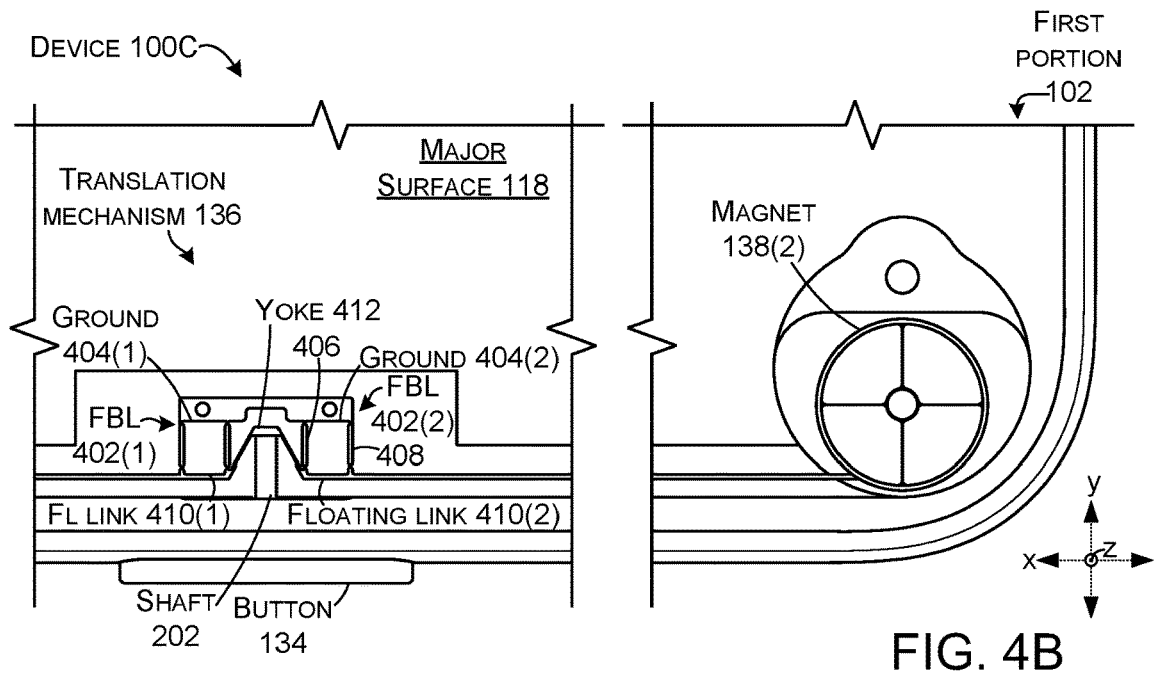
Figure 4C:
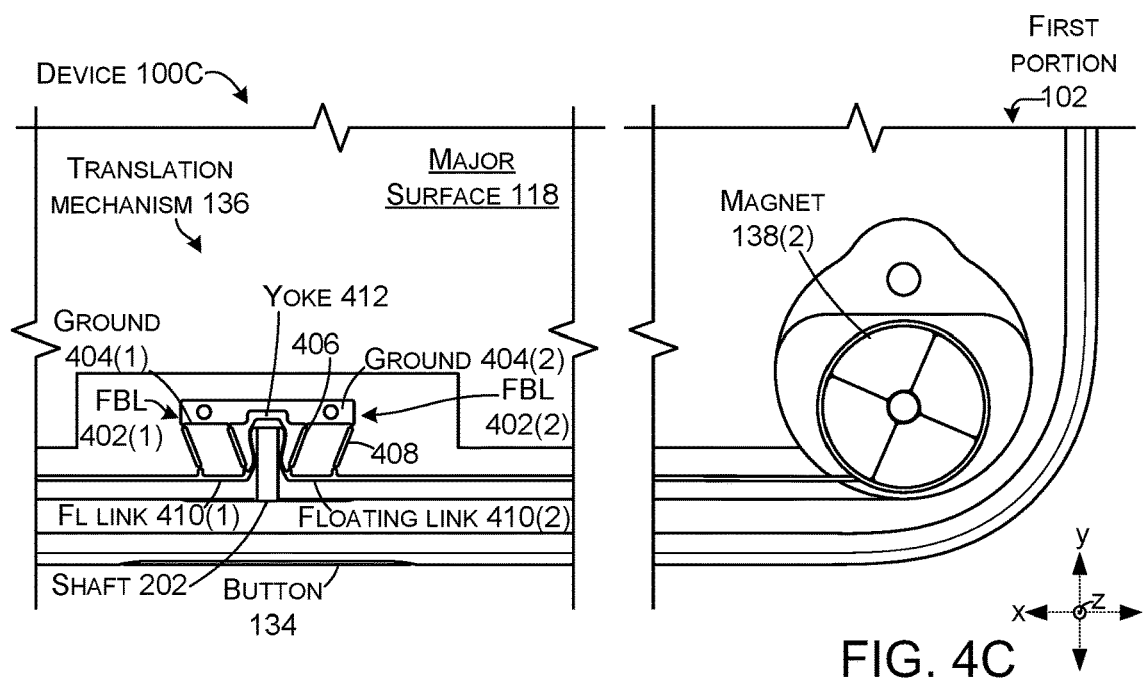

FIGS. 4A-4C collectively show another example device 100C and the translation mechanism 136 on the first portion 102. FIG. 4A shows regions of the first portion 102 with the button 134 in the 'out' posture. FIG. 4B is similar to FIG. 4A and shows an enlarged view of regions of the first portion 102 with the button 134 in the 'out' posture. FIG. 4C is a similar view to FIG. 4B with the button in the 'in' posture.

In this case the translation mechanism 136 entails four-bar linkages 402. The four-bar linkages 402 can include ground or ground links 404, intermediate links 406 and 408 (labeled only on the right side four-bar linkage to decrease clutter on the drawing page), and floating links 410. The floating links 410 can extend to the magnets 138. In this configuration, an individual four-bar linkage 402 is dedicated to each magnet 138. However, a single four-bar linkage 402 could be coupled to multiple magnets 138. Further, the four-bar linkage can be a rigid configuration where the linkages are rigid (e.g., are not intended to bend) and bending occurs generally only at the joints. Alternatively, the (four-bar) linkage can be a compliant linkage or mechanism where the links (e.g., flexible members) are intended to flex when exposed to the displacement to create the force in another direction. The four-bar linkages provide a technical solution of imparting the force on the magnets by changing the shape of the linkage.

In the illustrated configuration, the y direction movement of the shaft 202 is conveyed to yoke 412. The yoke 412 translates the movement of the shaft to the intermediate links 406 as can be seen by comparing FIGS. 4B and 4C. The force on intermediate links 406 changes the shape of the four-bar linkage 402 and increases a distance to the magnets 138. As such, the floating links 410 pull on, and rotate, magnets 138. As explained in the discussion above relative to FIGS. 2A-2C, rotation of magnets 138 can decrease the attraction between magnets 138 of the first portion 102 and magnets 140 of the second portion 104.

Figure 5A:
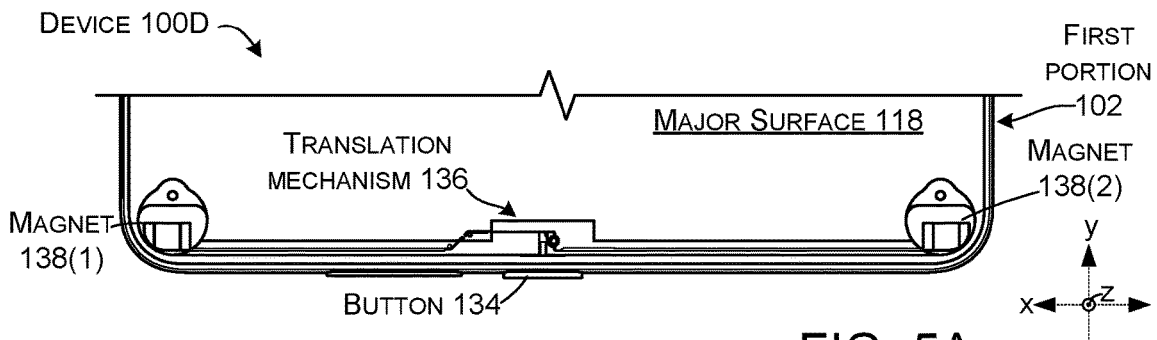
Figure 5B:
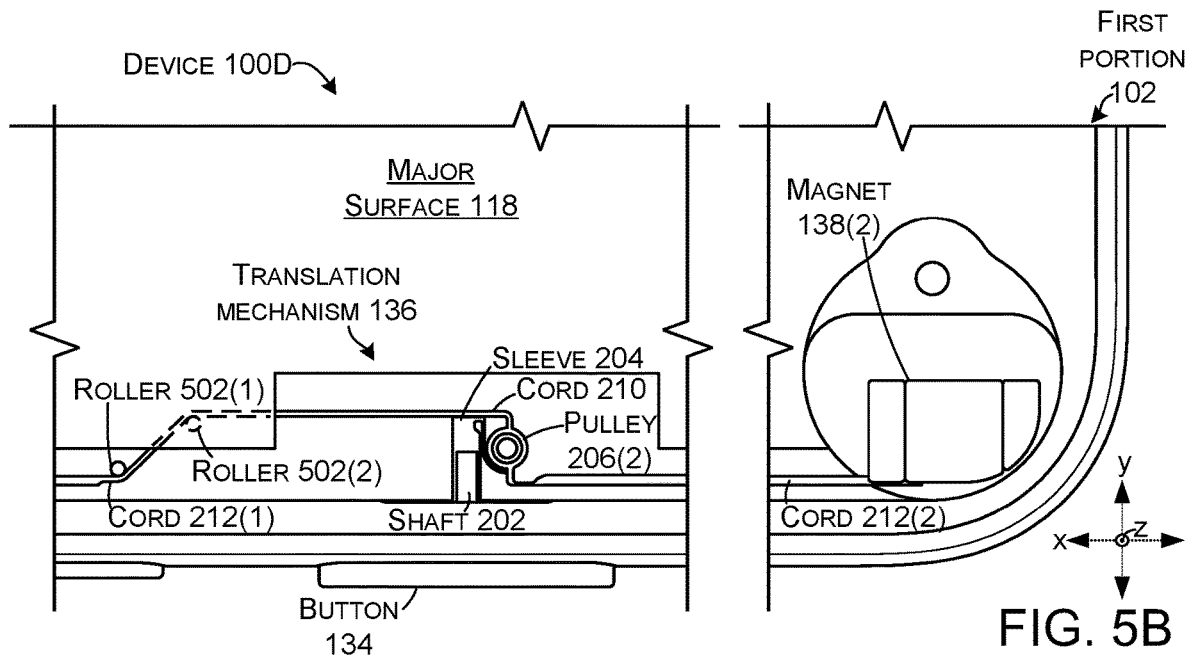
Figure 5C:
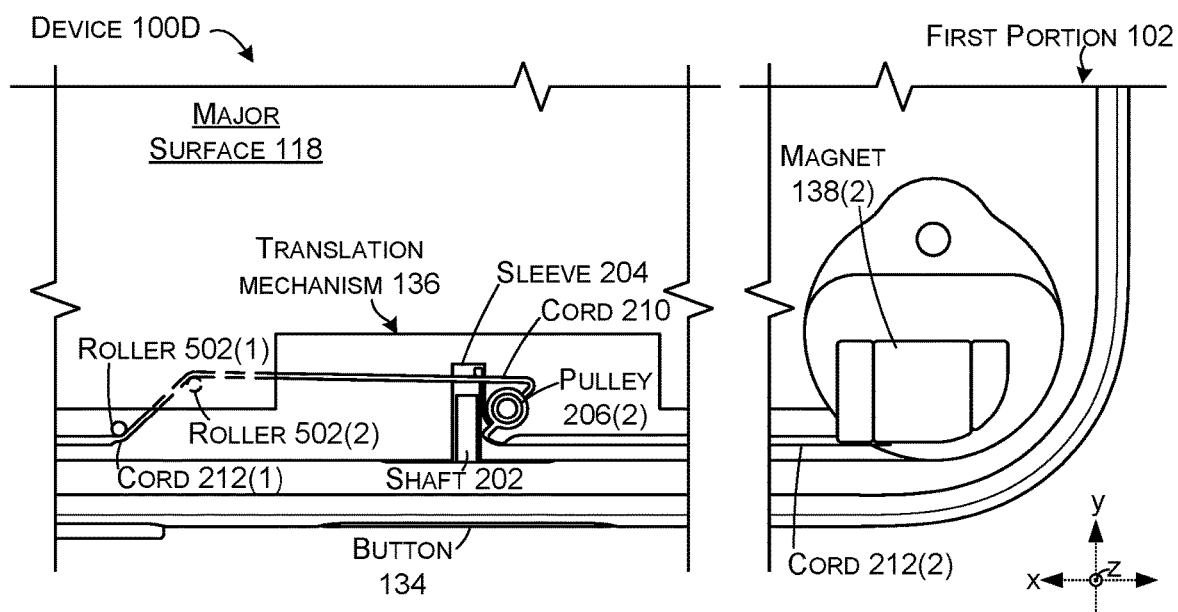

FIGS. 5A-5C collectively show another example device 100D and the translation mechanism 136 on the first portion 102. FIG. 5A shows regions of the first portion 102 with the button 134 in the 'out' posture. FIG. 5B is similar to FIG. 5A and shows an enlarged view of regions of the first portion 102 with the button 134 in the 'out' posture. FIG. 5C is a similar view to FIG. 5B with the button in the 'in' posture.

On this example device 100D, the translation mechanism 136 can employ a single pulley 206 that can create forces on multiple magnets 138, such as at the left and right distal corners of the first portion 102. This implementation can employ rollers 502 to the path of cord 212(1) that extends from the translation mechanism 136 to the left side of the first portion 102 on the drawing page. The rollers 502 can guide the cord 212(1) over (in the y-reference direction) the shaft 202 so that the cord can be coupled to the pulley 206 without interfering with movement of the shaft 202 as can be seen by comparing FIGS. 5B and 5C. In this configuration, displacement of the shaft 202 is translated to cord 212(1) by pulley 206. When the shaft is displaced in the y reference direction (e.g., toward the hinge axis) the pulley 206 rotates clockwise and pulls on the cord 212(1) in the x reference direction. Given that the cord 212(1) is captured between the pulley 206 and the magnet 138(1), a pulling force is created on the magnet 138(1) in the x reference direction. In this implementation, the pulling force causes the magnet 138(1) to move along a linear path (e.g., linear motion generally in the x reference direction). In other implementations, the pulling force causes rotational movement of the magnet. Other types of magnet movement are contemplated.

Figure 6A:
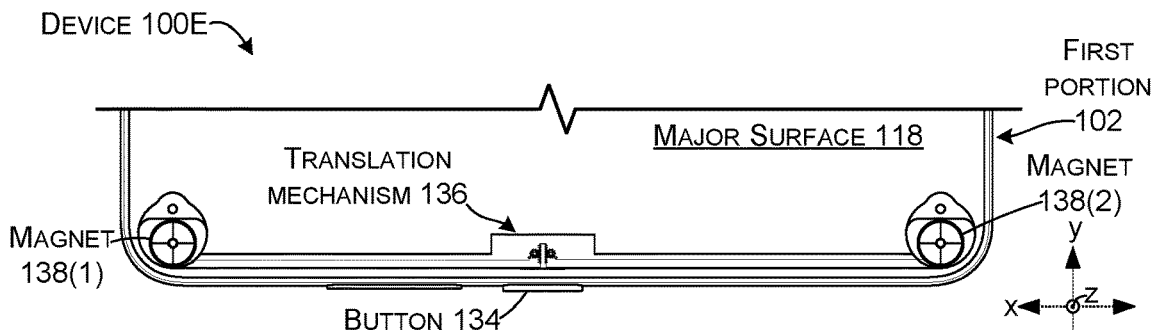
Figure 6B:
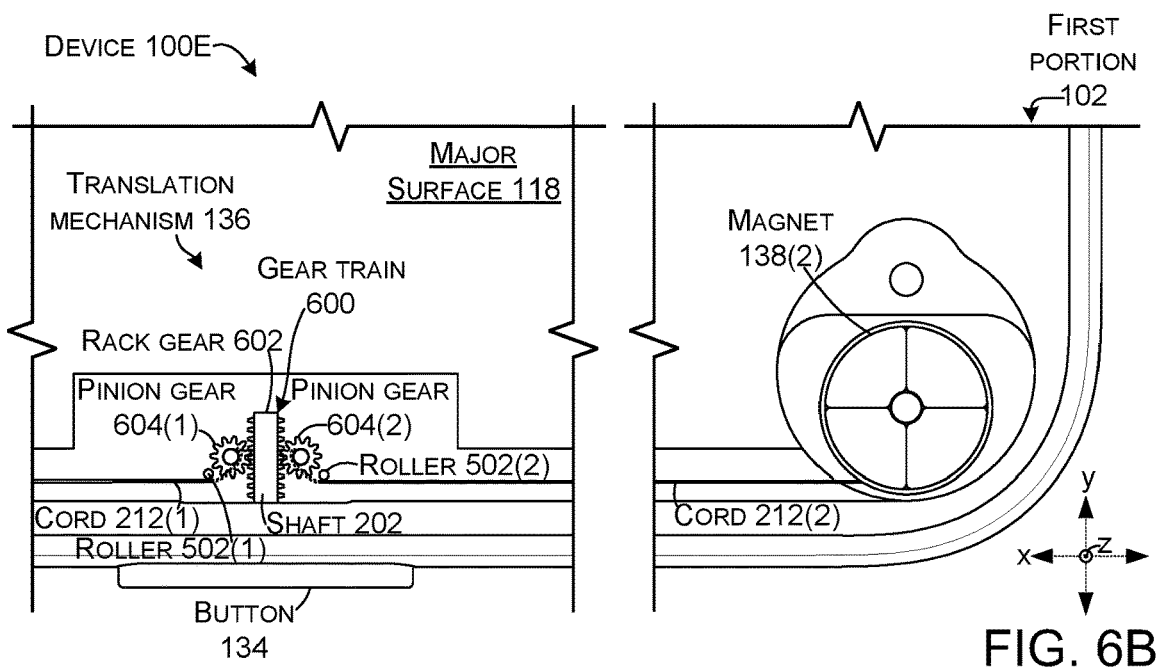
Figure 6C:
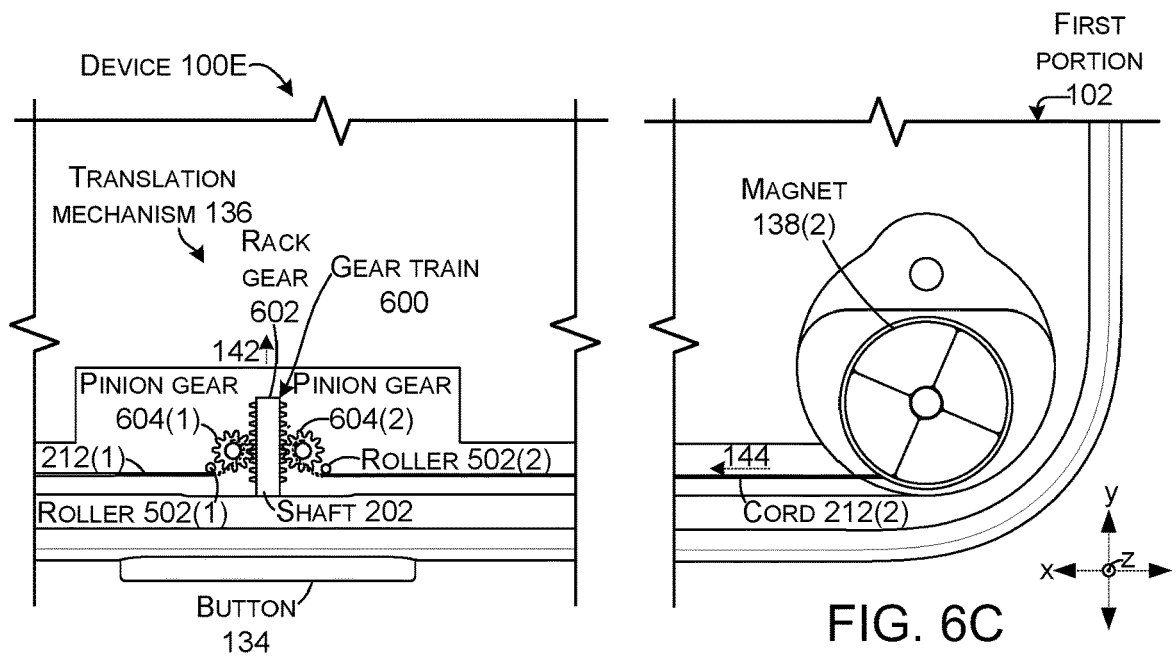

FIGS. 6A-6C collectively show another example device 100E and the translation mechanism 136 on the first portion 102. FIG. 6A shows regions of the first portion 102 with the button 134 in the 'out' posture. FIG. 6B is similar to FIG. 6A and shows an enlarged view of regions of the first portion 102 with the button 134 in the 'out' posture. FIG. 6C is a similar view to FIG. 6B with the button in the 'in' posture.

On this example device 100E, the translation mechanism 136 can employ a gear train 600, such as a rack gear 602 that interacts with pinion gears 604. The rack gear 602 can be an extension of the shaft 202 and thus provide a technical solution of directly converting movement of the shaft into rotation of the pinion gears. The cords 212 extend from the magnets 138 and are wrapped around a shaft of the pinion gears 604 (e.g., in front of or behind the pinion gears). The cords 212 are shown in ghost around the pinion gears 604 to reduce occlusion of the various involved elements and to provide clarity on the drawing.

As shown in FIG. 6C, user displacement of the shaft 202 and hence the rack gear 602 as represented by arrow 142 can be translated by the rack and pinion to wind the cords 212 around the pinion gears 604. Winding the cords 212 around the pinion gears 604 can create a force on the magnets 138 which is represented by arrow 144. The force represented by arrow 144 can act on magnets 138 and cause movement of the magnets 138 that decreases magnetic attraction between magnets 138 of the first portion 102 and magnets 140 of the second portion 104, which are shown in previous figures.

In this implementation, the translation mechanism 136 is interposed between the two magnets 138. However, other configurations are contemplated. For instance, some device configurations can employ a single magnet 138 on the first portion 102 that interacts with a single magnet 140 on the second portion 104.

Figure 7A:
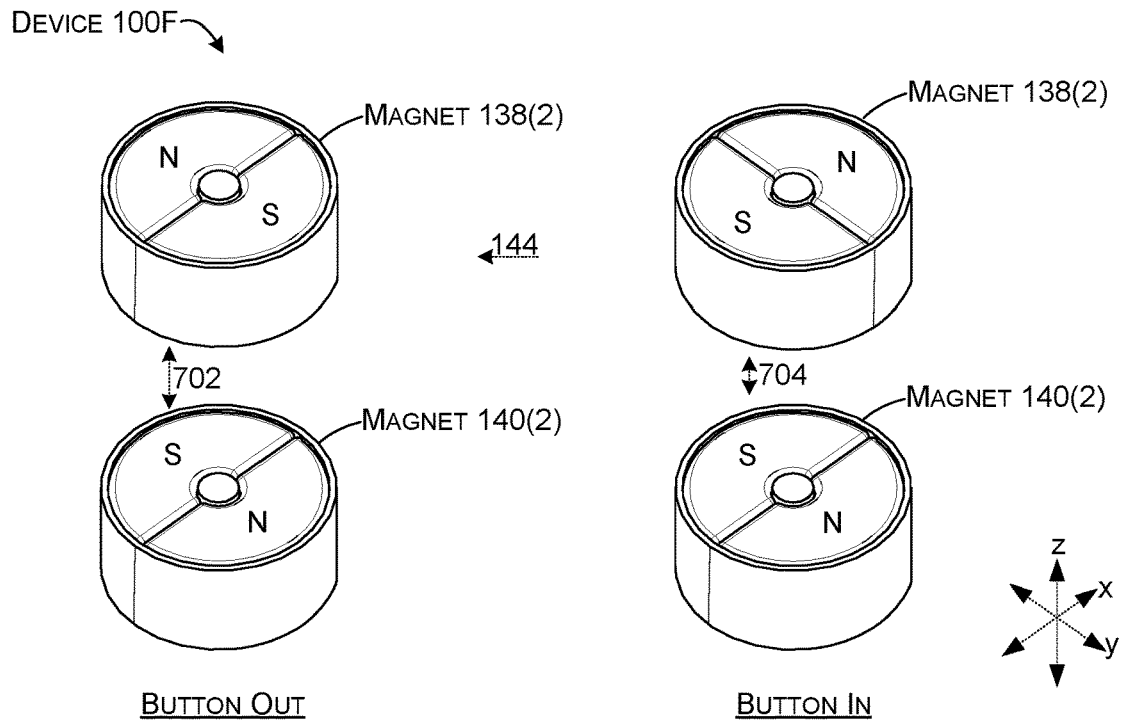

FIG. 7A shows an example configuration for magnets 138 and 140 in relation to device 100F. In this case, the magnets can be generally cylindrical. Other shapes are contemplated. For instance, rectangular cuboid shaped magnets are shown in FIGS. 3A-3C and 5A-5C.

In the illustrated configuration of FIG. 7A, the North and South poles of the magnets 138 and 140 are oriented radially on the magnet. In the 'Button Out' configuration the poles of magnet 138 are generally oppositely aligned with the poles of magnet 140 (e.g., N aligned with S and S aligned with N). This opposite alignment enhances/maximizes magnetic attraction between the first and second portions 102 and 104 as indicated by arrow 702.

The 'Button In' position produces rotation of magnet 138 due to force (arrow) 144 from the translation mechanism 136. The rotation reduces the 'opposite' alignment of the poles of magnets 138 and 140 as indicated by arrow 704. Arrow 704 is shorter than arrow 702 to reflect the decreased attraction forces. As mentioned above, depending on the extent of the rotation of magnet 138, the magnets 138 and 140 may actually repel one another rather than just having a reduced attraction. The repelling force can contribute to a pop-up function where the first and second portions physically rotate a few degrees away from the closed orientation when the user engages the button 134 in the closed orientation.

Figure 7B:
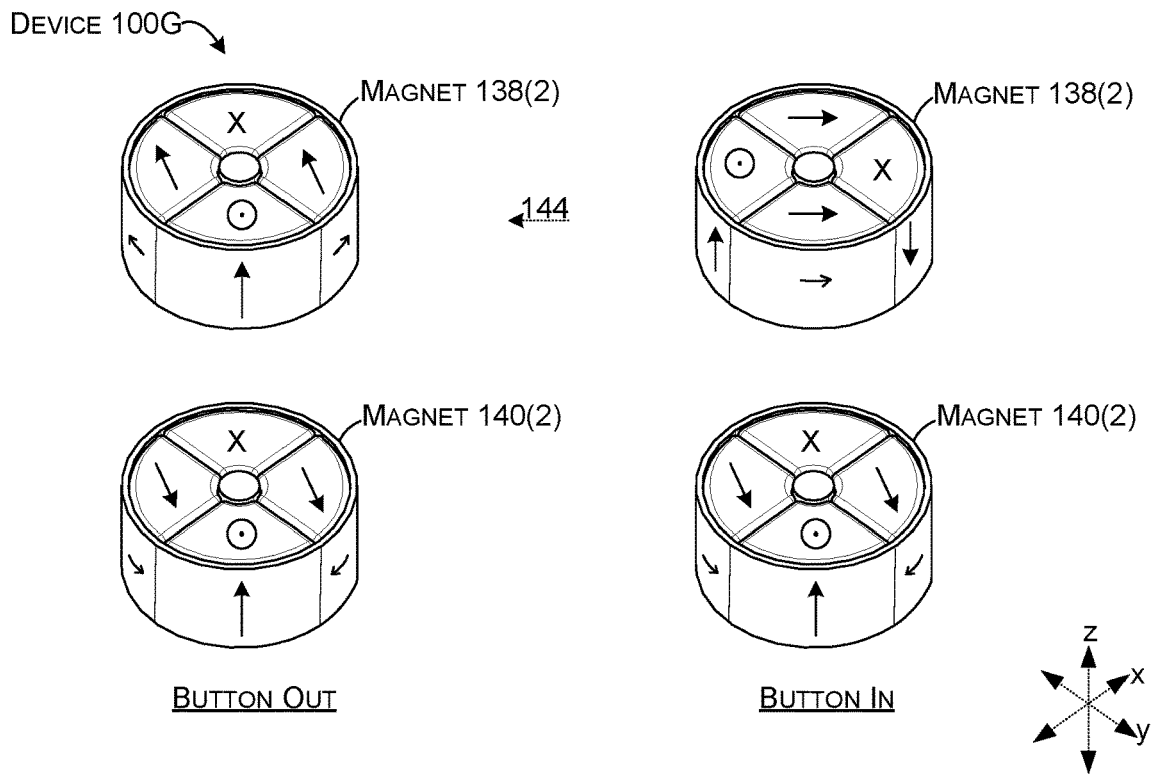

FIG. 7B shows another example configuration for magnets 138 and 140 in relation to device 100G. In this case, the magnets can be generally cylindrical and are configured as a Halbach array. However, in this case, the Halbach array is arranged radially rather than the traditional linear arrangement. Employing radial Halbach arrays on magnets 138 and 140 can create greater magnetic attraction between the magnets compared to similarly sized magnets shown in FIG. 7A. The magnetic attraction can be optimized when they are oriented for magnetic attraction as shown in the 'Button Out' configuration to create a relatively stronger attractive force. In the 'Button In' configuration, force (represented by force arrow 144) can rotate magnet 138 to diminish the attraction (e.g., relatively weaker attractive force) and/or create a repelling force instead.

The discussion below relates to example component materials and configurations. As mentioned above, in some configurations structural members 209 can have resistance to deformation relative to both pushing and pulling forces. In such cases, the structural members can be manifest as beams or tubes made from polymers or metals, among other configurations and materials. In other cases, the structural members can be relatively inelastic flexible materials, such as cords. In this case, relatively inelastic can mean stretching of less than about 5 percent when subject to pulling forces between the translation mechanism 136 and the magnets 138. Example cords can be solid materials or woven materials. Dyneema is an example material that can be used for the cords in either a cylindrical (e.g., rope) or flat (e.g., strap) configuration.

Individual elements of the translation mechanisms 136 can be made from various materials, such as metals, plastics, and/or composites. These materials can be prepared in various ways, such as from formed sheet metals, die cast metals, machined metals, 3D printed materials, molded or 3D printed plastics, and/or molded or 3D printed composites, among others, and/or any combination of these materials and/or preparations can be employed.

The present translation concepts can be utilized with any type of device, such as but not limited to notebook computers, smart phones, wearable smart devices, tablets, and/or other types of existing, developing, and/or yet to be developed devices.

Various methods of manufacture, assembly, and/or use for translation mechanisms and associated devices are contemplated beyond those shown above relative to FIGS. 1A-7B.

Although techniques, methods, devices, systems, etc., pertaining to translation mechanisms are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first rectangular cuboid portion extending from a proximal end to a distal end and having magnets positioned in corners of the distal end, a second rectangular cuboid portion extending from a proximal end to a distal end and having magnets positioned in corners of the distal end, a hinge secured to the proximal ends of the first rectangular cuboid portion and the second rectangular cuboid portion to allow motion of the first rectangular cuboid portion and the second rectangular cuboid portion from a closed orientation with the distal ends positioned against one another to an open orientation with the distal ends spaced apart from one another, a button positioned on the distal end of the first rectangular cuboid portion and having a displacement that is generally toward the hinge, and a translation mechanism that is coupled between the button and the magnets of the first rectangular cuboid portion and is configured to translate the displacement that is generally toward the hinge to a force that is generally parallel to the hinge and acts upon the magnets of the first portion to transition the magnets of the first rectangular cuboid portion from a first configuration where the magnets act cooperatively with the magnets of the second rectangular cuboid portion to provide a magnetic force to maintain the first and second rectangular cuboid portions in the closed orientation to a second configuration where the magnetic force is reduced compared to the first configuration.

Another example can include any of the above and/or below examples where the translation causes the magnets of the first rectangular cuboid portion to move linearly relative to the magnets of the second rectangular cuboid portion.

Another example can include any of the above and/or below examples where the translation causes the magnets of the first rectangular cuboid portion to rotate relative to the magnets of the second rectangular cuboid portion.

Another example can include any of the above and/or below examples where the translation mechanism comprises a four-bar linkage or wherein the translation mechanism comprises a compliant mechanism having flexible members that are deformed by the displacement of the button.

Another example can include any of the above and/or below examples where the translation mechanism comprises a gear train.

Another example can include any of the above and/or below examples where the translation mechanism comprises pulleys and cords.

Another example can include any of the above and/or below examples where the translation mechanism is interposed between the magnets on the corners of the first rectangular cuboid portion.

Another example can include any of the above and/or below examples where the button, the translation mechanism, and the magnets of the first rectangular cuboid lie in the same plane.

Another example can include any of the above and/or below examples where the magnetic force is reduced from a stronger attractive force in the first configuration to a weaker attractive force in the second configuration.

Another example can include any of the above and/or below examples where in the second configuration the magnetic force is reduced from an attractive force to a repelling force, Another example can include any of the above and/or below examples where the button is electrically coupled to electronic components in the first rectangular cuboid portion and the displacement of the button is configured to send a control signal to the electronic components.

Another example includes a device comprising a first portion extending from a hinge end to a distal end that includes a first magnet, a second portion extending from a hinge end to a distal end, the hinge end being rotationally secured around a hinge axis to the hinge end of the first portion, and the distal end including a second magnet, a button positioned on the distal end of the first portion and that is coupled to electronic components of the first portion, the button having a displacement that is generally toward the hinge axis and that is configured to send a control signal to the electronic components, and a translation mechanism that is coupled between the button and the first magnet and is configured to translate the displacement that is generally toward the hinge axis to a force that is generally parallel to the hinge axis and acts upon the first magnet of the first portion to transition attraction between the first and second magnets from a first configuration with a relatively high attraction to a second configuration with a relatively low attraction.

Another example can include any of the above and/or below examples where the translation mechanism is configured to transition the attraction by moving the first magnet.

Another example can include any of the above and/or below examples where the translation mechanism is configured to transition the attraction by rotating the first magnet.

Another example can include any of the above and/or below examples where the translation mechanism is configured to transition the attraction by moving the first magnet along a linear path.

Another example can include any of the above and/or below examples where the displacement is configured to cause the control signal to power on the electronic components and the transition to the relatively low attraction is configured to cause the first and second magnets to repel one another and cause the first and second portions to pop apart.

Another example includes a device comprising a first portion extending from a hinge end to a distal end that includes a first magnet, a second portion extending from a hinge end to a distal end, the hinge end being rotationally secured around a hinge axis to the hinge end of the first portion, and the distal end including a second magnet that creates an attractive force with the first magnet to bias the first and second portions toward one another in a closed orientation, and a button positioned on the distal end of the first portion and that is coupled to electronic components of the first portion, the button having a displacement that is generally toward the hinge axis and that is configured to both send a control signal to the electronic components and to create a force on the first magnet to cause the first magnet to move relative to the second magnet.

Another example can include any of the above and/or below examples where the button comprises a shaft that is oriented generally perpendicular to the hinge axis and is configured to engage a translation mechanism.

Another example can include any of the above and/or below examples where the translation mechanism is configured to convert movement of the shaft that is generally perpendicular to the hinge axis to a force generally parallel to the hinge axis that is imparted on the first magnet.

Another example can include any of the above and/or below examples where the control signal is configured to cause the electronic component to power on and the force imparted on the first magnet is configured to cause the first and second magnets to repel one another and move the first and second portions away from the closed orientation.

The invention claimed is:
1. A device, comprising:
 a first rectangular cuboid portion extending from a proximal end to a distal end and having magnets positioned in corners of the distal end;

a second rectangular cuboid portion extending from a proximal end to a distal end and having magnets positioned in corners of the distal end;

a hinge secured to the proximal ends of the first rectangular cuboid portion and the second rectangular cuboid portion to allow motion of the first rectangular cuboid portion and the second rectangular cuboid portion from a closed orientation with the distal ends positioned against one another to an open orientation with the distal ends spaced apart from one another;

a button positioned on the distal end of the first rectangular cuboid portion and having a displacement that is generally toward the hinge; and, a translation mechanism that is coupled between the button and the magnets of the first rectangular cuboid portion and is configured to translate the displacement that is generally toward the hinge to a force that is generally parallel to the hinge and acts upon the magnets of the first portion to transition the magnets of the first rectangular cuboid portion from a first configuration where the magnets act cooperatively with the magnets of the second rectangular cuboid portion to provide a magnetic force to maintain the first and second rectangular cuboid portions in the closed orientation to a second configuration where the magnetic force is reduced compared to the first configuration.

2. The device of claim 1, wherein the translation causes the magnets of the first rectangular cuboid portion to move linearly relative to the magnets of the second rectangular cuboid portion.

3. The device of claim 2, wherein the translation causes the magnets of the first rectangular cuboid portion to rotate relative to the magnets of the second rectangular cuboid portion.

4. The device of claim 3, wherein the translation mechanism comprises a four-bar linkage or wherein the translation mechanism comprises a compliant mechanism having flexible members that are deformed by the displacement of the button.

5. The device of claim 4, wherein the translation mechanism comprises a gear train.

6. The device of claim 5, wherein the translation mechanism comprises pulleys and cords.

7. The device of claim 6, wherein the translation mechanism is interposed between the magnets on the corners of the first rectangular cuboid portion.

8. The device of claim 7, wherein the button, the translation mechanism and the magnets of the first rectangular cuboid lie in the same plane.

9. The device of claim 1, wherein the magnetic force is reduced from a stronger attractive force in the first configuration to a weaker attractive force in the second configuration.

10. The device of claim 9, wherein in the second configuration the magnetic force is reduced from an attractive force to a repelling force.

11. The device of claim 1, wherein the button is electrically coupled to electronic components in the first rectangular cuboid portion and the displacement of the button is configured to send a control signal to the electronic components.

12. A device, comprising:
a first portion extending from a hinge end to a distal end that includes a first magnet;

a second portion extending from a hinge end to a distal end, the hinge end being rotationally secured around a hinge axis to the hinge end of the first portion, and the distal end including a second magnet;

a button positioned on the distal end of the first portion and that is coupled to electronic components of the first portion, the button having a displacement that is generally toward the hinge axis and that is configured to send a control signal to the electronic components; and, a translation mechanism that is coupled between the button and the first magnet and is configured to translate the displacement that is generally toward the hinge axis to a force that is generally parallel to the hinge axis and acts upon the first magnet of the first portion to transition attraction between the first and second magnets from a first configuration with a relatively high attraction to a second configuration with a relatively low attraction.

13. The device of claim 12, wherein the translation mechanism is configured to transition the attraction by moving the first magnet.

14. The device of claim 12, wherein the translation mechanism is configured to transition the attraction by rotating the first magnet.

15. The device of claim 12, wherein the translation mechanism is configured to transition the attraction by moving the first magnet along a linear path.

16. The device of claim 15, wherein the displacement is configured to cause the control signal to power on the electronic components and the transition to the relatively low attraction is configured to cause the first and second magnets to repel one another and cause the first and second portions to pop apart.

17. A device, comprising:
a first portion extending from a hinge end to a distal end that includes a first magnet;

a second portion extending from a hinge end to a distal end, the hinge end being rotationally secured around a hinge axis to the hinge end of the first portion, and the distal end including a second magnet that creates an attractive force with the first magnet to bias the first and second portions toward one another in a closed orientation; and, a button positioned on the distal end of the first portion and that is coupled to electronic components of the first portion, the button having a displacement that is generally toward the hinge axis and that is configured to both send a control signal to the electronic components and to create a force on the first magnet to cause the first magnet to move relative to the second magnet.

18. The device of claim 17, wherein the button comprises a shaft that is oriented generally perpendicular to the hinge axis and is configured to engage a translation mechanism.

19. The device of claim 18, wherein the translation mechanism is configured to convert movement of the shaft that is generally perpendicular to the hinge axis to a force generally parallel to the hinge axis that is imparted on the first magnet.

20. The device of claim 18, wherein the control signal is configured to cause the electronic component to power on and the force imparted on the first magnet is configured to cause the first and second magnets to repel one another and move the first and second portions away from the closed orientation.

* * * * *